(12) United States Patent
Meyer et al.

(10) Patent No.: US 7,158,544 B2
(45) Date of Patent: Jan. 2, 2007

(54) COMMUNICATION DEVICE AND METHOD

(75) Inventors: Michael Meyer, Aachen (DE); Reiner Ludwig, Düren (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 11/036,881

(22) Filed: Jan. 14, 2005

(65) Prior Publication Data

US 2005/0122995 A1 Jun. 9, 2005

(51) Int. Cl.
*H04J 3/00* (2006.01)
(52) U.S. Cl. ...................... 370/529; 714/748
(58) Field of Classification Search ............. 370/229, 370/230, 230.1, 231, 232, 235, 392, 394, 370/473, 474, 529; 709/235; 714/746, 747, 714/748, 749, 750
See application file for complete search history.

(56) References Cited

U.S. PATENT DOCUMENTS 6,011,796 A * 1/2000 Rezaiifar et al. ........... 370/394
6,076,114 A * 6/2000 Wesley ........................ 709/235
6,392,993 B1 * 5/2002 Hamilton et al. ........... 370/230
6,483,845 B1 * 11/2002 Takeda et al. .............. 370/429
2005/0036511 A1 * 2/2005 Baratakke et al. .......... 370/469

* cited by examiner

*Primary Examiner*—Chau Nguyen
*Assistant Examiner*—Steven Blount

(57) ABSTRACT

A device and method for controlling data unit communications between a sender and a receiver, and flexibly responding to a potential data loss event. Data to be sent are divided into data units and transmitted from the sender to the receiver. If the receiver fails to receive a data unit, the sender retransmits the data unit using a flow control procedure using adaptive parameters. The sender inserts a mark in each transmitted data unit indicating whether each data unit is an original transmission or a retransmission. For each data unit correctly received, the receiver inserts the corresponding mark in an acknowledgment data unit and sends the acknowledgment to the sender. The sender determines whether the correctly received data unit was an original transmission or a retransmission based on the mark or by comparing the round-trip time for the acknowledged data unit with a predetermined round-trip time for an original transmission.

14 Claims, 4 Drawing Sheets

COMMUNICATION DEVICE AND METHOD

BACKGROUND OF THE INVENTION

The present invention relates to a communication device and method, where a data unit oriented communication between a sender and a receiver is performed, said sender and receiver operating in accordance with a predetermined communication protocol.

Data unit oriented communication is well-known. In data unit oriented communication an amount of data is divided into one or more data units, where the structure of the data units is defined by a communication protocol to which the sender and receiver in the communication adhere. The protocol also defines how specific information is to be coded, and how the sender and/or receiver may react to specific information. Data unit oriented communication is also known as packet exchange communication. It should be noted that the data units used in connection with specific protocols have different names, such as packets, frames, segments etc. For the purpose of the present description, the term "data unit" shall generically refer to all types of units used in a data unit oriented communication.

A feature that many communication protocols use for increasing reliability is that of acknowledging received data. More specifically, a sender or sending peer of the given protocol sends out data units, and the receiver or receiving peer of the given protocol acknowledges the correct receipt by returning appropriate acknowledgment data units. In this way, the sending peer is informed that the data units that were sent were also correctly received, and can accordingly adjust the flow control of the further data units to be sent. An example of a protocol that uses acknowledgment data units is the so-called transmission control protocol (TCP), which is a part of the TCP/IP protocol suite.

The transmission control protocol and the TCP/IP protocol suite are e.g. well described in "TCP/IP Illustrated, Volume 1—The Protocols" by W. Richard Stevens, Addison-Wesley, 1994.

In order to cope with the fact that data units or acknowledgment data units may be lost, a time-out feature is provided in many protocols. Such a time-out feature means that a time-out period is set when data is sent, and if the specific data has not been acknowledged by the time the time-out period expires, a time-out response procedure is started. In TCP, the time-out response consists in retransmitting the data that was not acknowledged, and resetting one or more flow control parameters.

As an example, TCP uses a window-based flow control. TCP is a byte oriented protocol that divides a given number of bytes to be sent into so-called segments, and a record of the sent data is kept in terms of bytes, i.e. up to which byte the data was sent, and a record of the received data is also kept in terms of bytes, i.e. up to which byte the data was received. The simplest way of controlling the flow of segments in connection with acknowledgment messages would be to send a segment and not send the next segment until the segment last sent was acknowledged. Such a method of flow control would however not be very efficient. As already mentioned, TCP uses window-based flow control, which is also referred to as flow control according to sliding windows. This concept is also well described in the above mentioned book by W. Richard Stevens.

FIG. 2 illustrates the concept of sliding windows. As can be seen, an amount of 8.192 bytes is to be sent in the example, where this amount is divided into 8 segments. The sending of segments is controlled in accordance with the send window, where the left end of the send window is defined by the data in the segments that have been sent and already acknowledged. In the example of FIG. 2 this is the data up to 2.048 bytes, i.e. the segments 1 and 2. The adjustment of the length of the send window, and thereby the right end of the window is a matter of the control procedure, which need not be explained in detail here.

The send window defines the amount of data which may have its corresponding acknowledgment outstanding. In the example of FIG. 2, the data up to 4 096 bytes, i.e. segments 3 and 4 have been sent and not yet acknowledged, and the difference between such sent and not acknowledged segments and the right end of the send window defines the usable window, i.e. the data that may still be sent without having received any further acknowledgments. As a consequence, in the example of FIG. 2 segments 5 and 6 may still be sent, but segments 7 and 8 can only be sent if the window moves to the right, which happens if further segments are acknowledged such that the left end moves to the right and/or if the length of the send window increases.

Furthermore, it should be noted that TCP provides for cumulative acknowledgment, i.e. there is not a one-to-one correspondence between segments and acknowledgments for segments, because one acknowledgment message may cover a plurality of segments. As an example, the receiving peer for the data amount shown in FIG. 2 could send an acknowledgment of bytes up to 4.096, such that this acknowledgment message would cover both segments 3 and 4.

The send window used by the sending peer will typically be determined by the so-called offered or advertised window, which is a data length provided to the sending peer by the receiving peer. In this way, the receiving peer can influence how many segments the sending peer will send at a time, and typically the advertised window will be calculated on the basis of the receiving peer's receive buffer. Also, the advertised window is a dynamic parameter that may be changed with every acknowledgment sent by the receiving peer.

Beyond the advertised window, it is also known to define the so-called congestion window, which is used in connection with several congestion control routines such as slow start, congestion avoidance, fast retransmit and fast recovery, again see e.g. the above mentioned book by W. Richard Stevens. The congestion window is a record that the sending peer keeps, and it is intended to take into account the congestion along the connection between the sending peer and receiving peer. As a typical control mechanism, the send window will be defined as the smaller of the advertised window and congestion window.

While the advertised window is a flow control imposed by the receiving peer, the congestion window is a flow control imposed by the sending peer, as a mechanism for taking congestion into account.

In a general sense, the congestion window is an example of an adaptive flow control parameter. In TCP the above mentioned time-out response consists in resetting the congestion window to one segment and then consequently only sending one segment, namely retransmitting the segment that was not acknowledged and thereby caused the time-out. The sending peer then waits for the acknowledgment of said retransmitted segment.

Another example of an adaptive flow control parameter is the time out period itself, which e.g. in TCP is referred to as RTO (Retransmission Time Out). The RTO is doubled as a response to a time out.

As already mentioned, the time-out feature is a data loss detection mechanism. Other data loss detection mechanisms exist. Another example is the retransmission of data units in TCP in response to the receipt of duplicate acknowledgments. This mechanism will be briefly explained in the following.

As already mentioned (see e.g. FIG. 2), a data amount to be sent is divided into a sequence. Conventional implementations of TCP are arranged such that if the receiving peer has received and acknowledged a certain data amount up to a given byte (a certain number of consecutive segments), it expects the data that is next in the sequence. For example, if segments up to segment 4 have been received, then segment 4 is acknowledged-and the receiving peer expects to receive segment 5. If it then receives a further data unit that is different from segment 5 (e.g. segments 6, 7 and 8), it continues to acknowledge segment 4 for each data unit it receives. As a consequence, the sending peer receives duplicate acknowledgments. Commonly, TCP is implemented in such a way that the sending peer will count the number of duplicate acknowledgments, and if a certain threshold value is reached (e.g. 3), then the data unit next in the sequence to the data unit for which duplicate acknowledgments were received is retransmitted.

SUMMARY OF THE INVENTION

It is an object of embodiments of the present invention to improve the communication in a system using a communications protocol that specifies the acknowledgment of sent data and specifies a data loss detection function, such as a timeout function or a duplicate acknowledgment response function.

In accordance with embodiments of the present invention, a sender in a communication will conduct a response procedure in response to an event that triggers a data loss detection mechanism, where the response procedure comprises at least two different modes for adapting the adaptive parameters used in flow control. In this way the method and device of the present invention are highly flexible in their management of triggering events, and can especially be implemented in such a way that the response procedure may be chosen depending on various potential causes of the triggering event, such that the correct responsive measures to a given situation may be invoked, and thereby measures can be avoided that might actually aggravate situations that may occur after a data loss detection mechanism was triggered.

The data loss detection mechanism is a mechanism that is capable of detecting a data loss. Examples are a time-out mechanism or a duplicate acknowledgment mechanism. Naturally, the invention may be applied to any suitable data loss detection mechanism.

According to embodiments of the present invention, a response procedure comprises at least two different modes for adapting the adaptive parameters used in flow control. As an example, which constitutes a preferred embodiment, there are two modes, which are respectively associated with different causes of a time-out or a predetermined number of duplicate acknowledgments (e.g. the above mentioned 3). More specifically, a first mode is associated with the loss of a data unit, and the second mode is associated with an excessive delay along the connection. Due to the use of two different modes, it is possible to adapt the parameters as is appropriate for the cause of the timeout or duplicate acknowledgments. Accordingly, the flow control procedure will contain one or more evaluation and judgment steps, in which the triggering event is qualified, e.g. a categorization is conducted as to what caused the event. Then, depending on the result of this characterization, an appropriate response procedure may be enabled. In the context of the above example, if it is determined that the time-out or duplicate acknowledgments are caused by the loss of a data unit, then the known response procedure to the loss of data units may be run, as it is e.g. known from conventional TCP, which assumes that any time-out or the receipt of several duplicate acknowledgments is caused by the loss of a data unit. In accordance with the present embodiment, there is however a second mode, and if it is determined that the time-out or duplicate acknowledgments are caused by an excessive delay along the connection, then an excessive delay response procedure is run, which will typically be different from the response procedure to the loss of a data unit.

More specifically, as will also be explained in more detail in the following, the judgment that data units have been lost will be answered by reducing the transmission rate to thereby avoid further congestion. On the other hand, if there is excessive delay along the connection, then the measures taken in response to a supposed loss of data units would not be helpful, much rather they might actually aggravate the problem causing the excessive delay. Consequently, the response procedure to excessive delay will typically be different, and e.g. comprise keeping the transmission rate at the previous level, but on the other hand increasing the time-out period, such that further unnecessary retransmissions are avoided.

Naturally, the present invention may be implemented as providing an arbitrary number of modes or response procedures to various causes of triggering events. The number of modes and the specific measures taken in each mode naturally depend on the specific situation, i.e. the chosen protocol, the given communication situation, etc. An important aspect of the present invention is that although the data loss detection mechanism is capable of detecting data loss, the reaction to the triggering of the data loss detection mechanism does not assume that a data loss has necessarily occured, much rather a flexible response is possible, which may take into account various causes of the triggering event.

BRIEF DESCRIPTION OF THE DRAWINGS

Further aspects and advantages of embodiments of the present invention shall be better understood from the following detailed description, which makes reference to the figures, in which.

DETAILED DESCRIPTION OF PREFERRED EMBODIMENTS

Although the following description will be generally directed towards any communications protocol that makes use of data acknowledgment and also provides a time-out feature, examples will often be given that relate to the transmission control protocol TCP known from the TCP/IP protocol suite. The application of the present invention to this protocol is a preferred embodiment. In order to avoid any unnecessary repetition, the disclosure in the introduction of this application is incorporated into the invention disclosure.

Figure 1:
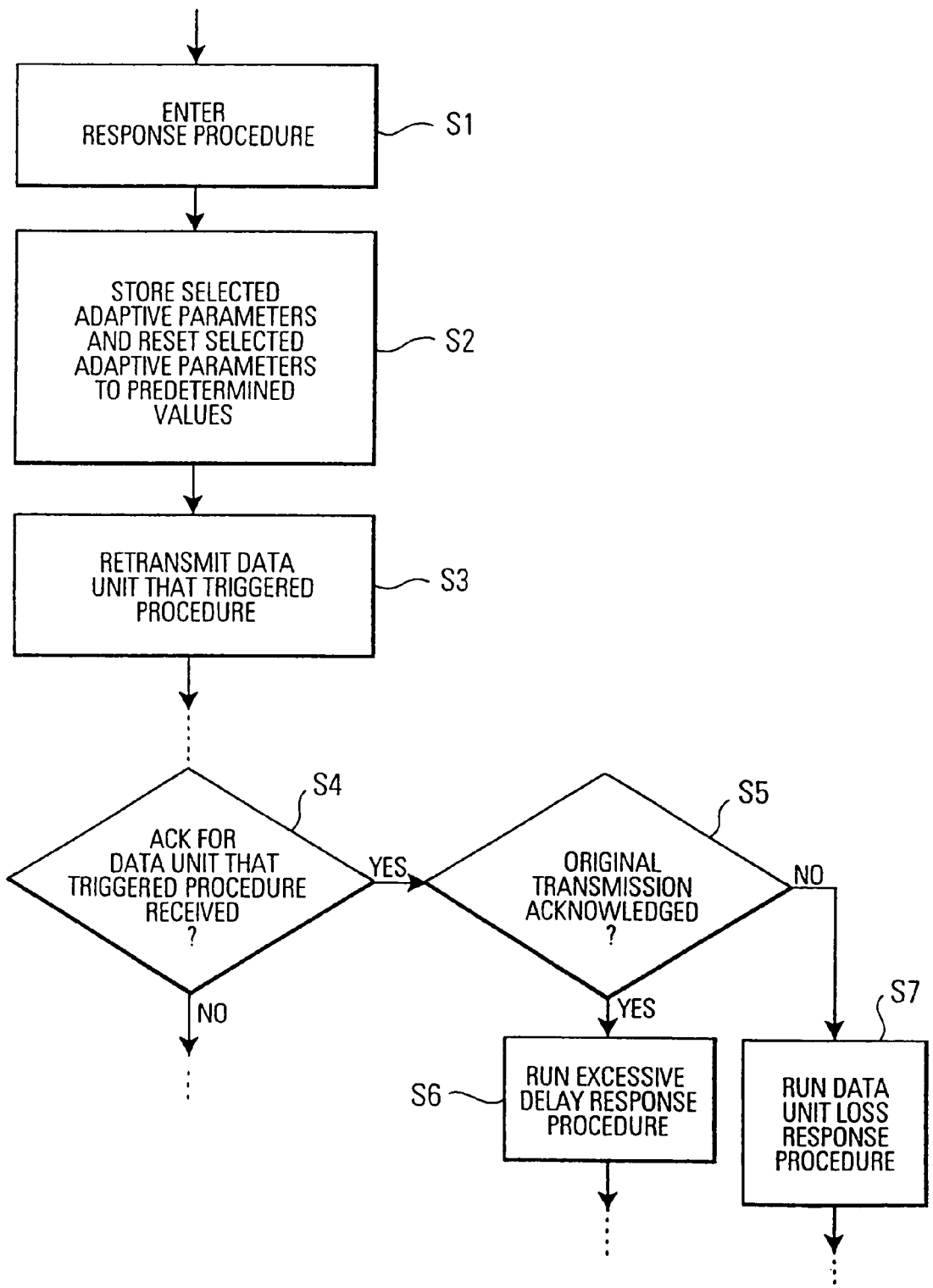
FIG. 1 shows a preferred embodiment of a control procedure according to the present invention.
Figure 2:
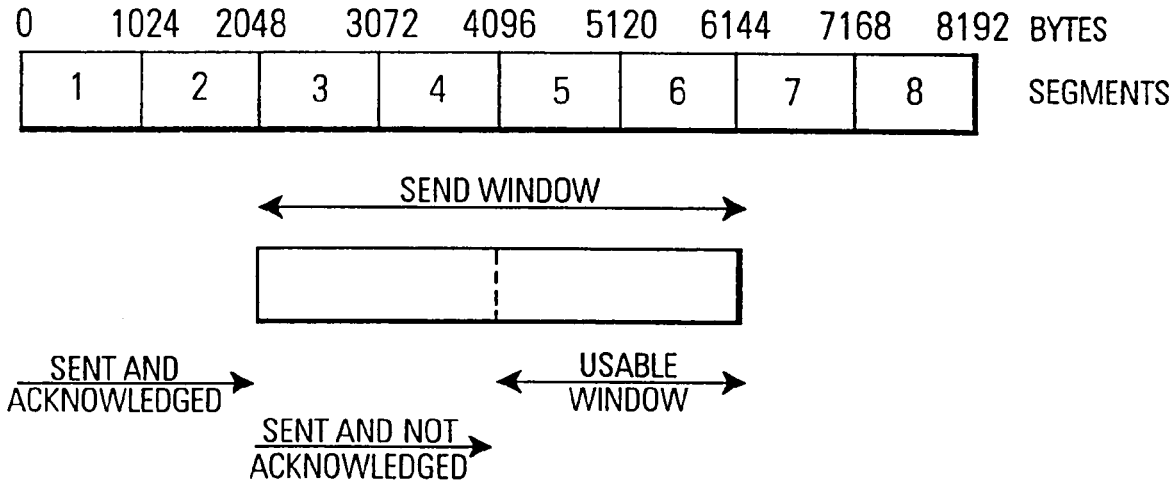
FIG. 2 is an explanatory diagram for describing the concept of window-based flow control.

FIG. 1 shows a partial flow diagram of a preferred embodiment of the present invention. As can be seen, step S1 indicates that a response procedure is entered. FIG. 1 does not show the flow control procedure leading up to this point, as it is of no importance for the present invention. For example, it may be the window-based flow control procedure explained in connection with FIG. 2 and e.g. well known from TCP. It is only important for the invention that there is data acknowledgment and a data loss detection feature, such that a sending peer of the protocol has the capability of detecting a possible or potential data loss, and may conduct a corresponding response procedure. As already mentioned, the data loss detection feature may e.g. be a time-out feature or a duplicate acknowledgment detection feature.

In the example of FIG. 1, after the response procedure is entered, selected adaptive parameters that are used for the flow control are stored and then reset to predetermined values in step S2. As an example, the time-out period and/or the above described congestion window are such adaptive flow control parameters. In conventional TCP, the congestion window is typically reset to a value of one segment and at the same time the RTO is doubled. It should be noted that not all adaptive parameters used in the flow control procedure need to in fact be changed, much rather only a selected number.

Also, it should be clear that the present invention is naturally not restricted to window-based flow control and the associated adaptive parameters, much rather the invention is applicable to any flow control principle and the associated adaptive parameters.

Returning to FIG. 1, the data unit that triggered the event (e.g. caused a time-out) is retransmitted in step S3. In other words, when staying with the example of a time-out, the data unit for which no acknowledgment was received during the time-out period is retransmitted. Then, at a later point it is determined in step S4 if an acknowledgment associated with the retransmitted data unit has been received. This may be a cumulative acknowledgment or also a single acknowledgment. It may be noted that the dotted lines in FIG. 1 indicate that other steps may be interposed, but these are of no importance to the present invention. Then, according to the preferred example of FIG. 1, step S5 determines if the acknowledgment associated with the data unit that was retransmitted in fact acknowledges the original transmission of the data unit or the retransmission. It should be noted that the "original transmission" may already be a retransmission, such that the "retransmission" may be the retransmission of a retransmission etc. There are various possibilities of implementing step S5, as will be explained further on.

If step S5 determines that the acknowledgment message in fact acknowledges the retransmission of the data unit, then the procedure goes to step S7, in which a data unit loss response procedure is run, because the negative outcome of the decision step S5 indicates that the original transmission of the data unit was lost. In the example of TCP, step S7 will consist in conventional measures against data unit loss.

On the contrary, if the decision step S5 is answered in the affirmative, then the procedure goes to step S6, in which a response procedure is run that answers an excessive delay. In other words, because step S5 indicated that in fact the original transmission of the data unit was not lost, but only excessively delayed, corresponding measures must be taken. For example, when taking TCP as a protocol example, this may consist in returning the congestion window to the value stored in step S2 and on the other hand adapting the time-out period to the delay. In other words, the round trip time RTT associated with the original transmission and the acknowledgment of the original transmission can be used as a basis for adapting the time-out period. Thereby, further unnecessary retransmissions and time-outs or duplicate acknowledgments due to excessive delay can be avoided.

Preferably, the congestion window is not simply reset to the previous value, but much rather is set to the value it would have assumed, had the response procedure not taken place, i.e. had the data loss detection mechanism not been triggered.

As can be seen, the example of FIG. 1 shows a first mode consisting of steps S2, S3, S4, S5 and S7, as well as a second mode consisting of steps S2, S3, S4, S5 and S6.

In order to better explain the present invention, reference will now be made to FIG. 3, which shows an example of a flow control procedure conducted in connection with conventional TCP. The graph shows the amount of data in bytes transported over time. As can be seen, the first two segments are sent at time t=4s. Then, due to the interaction of receiving acknowledgment data units and the adjustment of adaptive parameters not shown, segments are sent.

For the purpose of explanation, it should be noted that the diamond shaped symbols refer to segments, and the square symbols to acknowledgment data units. The diamond symbols indicate the first byte of the segment, whereas the squares indicate the lowest unacknowledged byte. The acknowledgment data units indicated at a certain segment level always acknowledge the sent segments up to that segment level. In other words, the acknowledgment at a segment level of 6.400 bytes (t=12s) acknowledges the segments below 6.400 byte, but not including byte 6.400. Quite to the contrary, as explicitly indicated in the graph, the segment at 6.400 byte (t=10s) is a data unit or packet that causes a time-out. As a consequence, a retransmission is conducted of said data unit at the 6.400 byte level.

Figure 3:
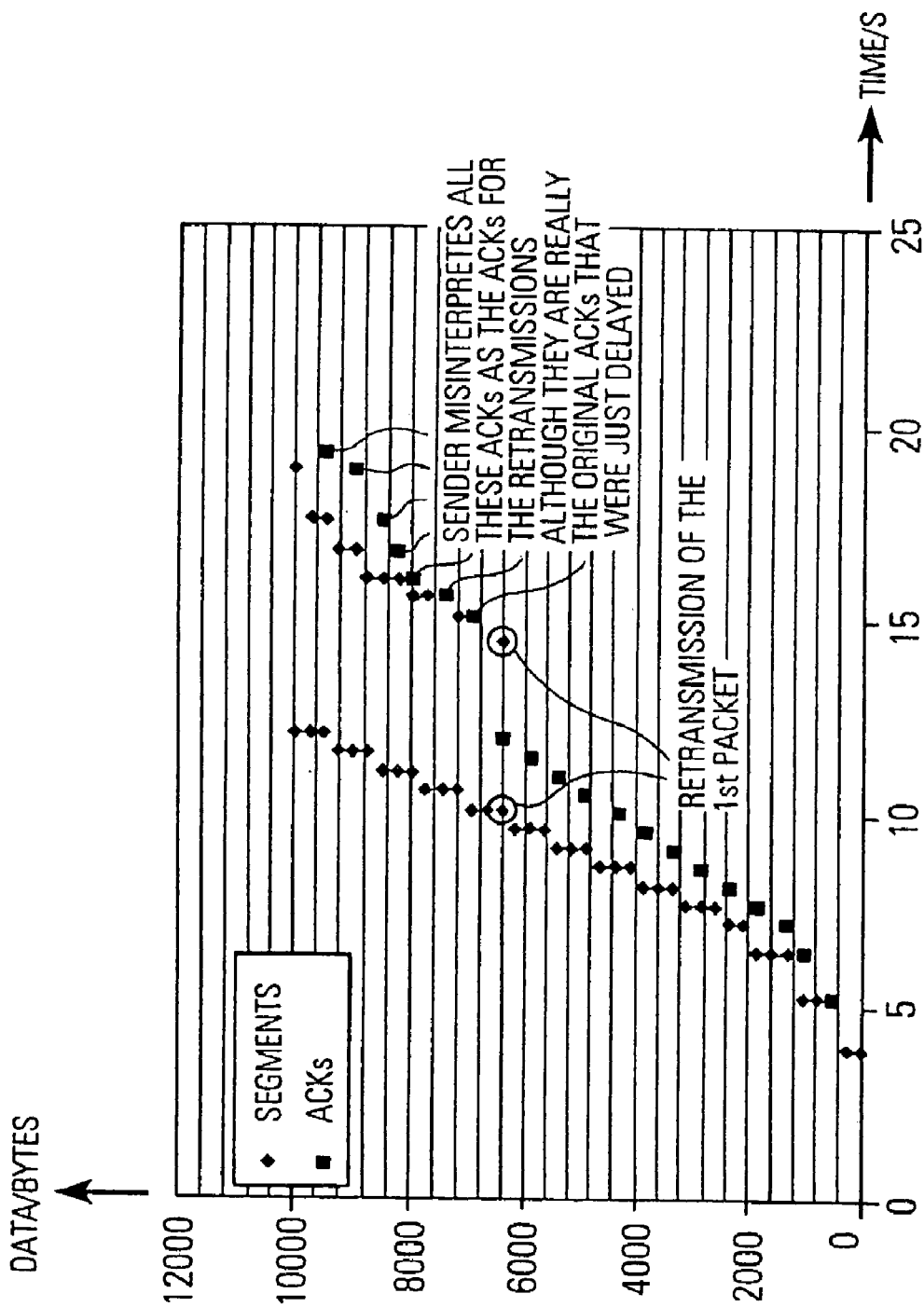
FIG. 3 is a graph for explaining the advantages of the present invention.

Now, if it is assumed that the time-out shown in FIG. 3 was caused by an excessive delay and not by the shown first packet being lost, then the retransmission has the following negative consequences.

For one thing, it leads to a decreased throughput performance, as the same data has to traverse the connection or connecting path twice, which wastes bandwidths that could have otherwise been used for useful data. This negative consequence will occur in any protocol that falsely responds to a time-out by retransmitting the data unit.

If, as shown in FIG. 3, the TCP protocol is used, then the reaction of the sending peer to such a time-out not caused by data unit loss is particularly disadvantageous: the sender will retransmit all outstanding packets and above that reduce its transmission rate. This is explicitly shown in FIG. 3.

It may be noted that the above described time-out not caused by data unit loss is also referred to as a spurious time-out.

As also shown in FIG. 3, in conventional TCP the sender misinterprets all acknowledgments associated with retransmitted data units as acknowledging the retransmission, even though these acknowledgments (ACKs) in fact are delayed acknowledgments of the original transmissions.

What FIG. 3 does not show, is that additionally the duplicate data units sent by the sending peer will trigger duplicate acknowledgments at the receiving peer, which will lead to yet another reduction in the transmission rate at the conventional TCP sender, namely the congestion window is set to one half of its earlier value.

The occurrence of excessive delay that goes beyond what the TCP time-out period can account for, may especially appear in wireless networks or such protocol connections of which at least a part runs over a wireless link. The inventors of the present application realized that spurious time-outs can happen often enough in such networks, so that serious performance degradation results. Examples of this will now briefly be mentioned.

Figure 4:
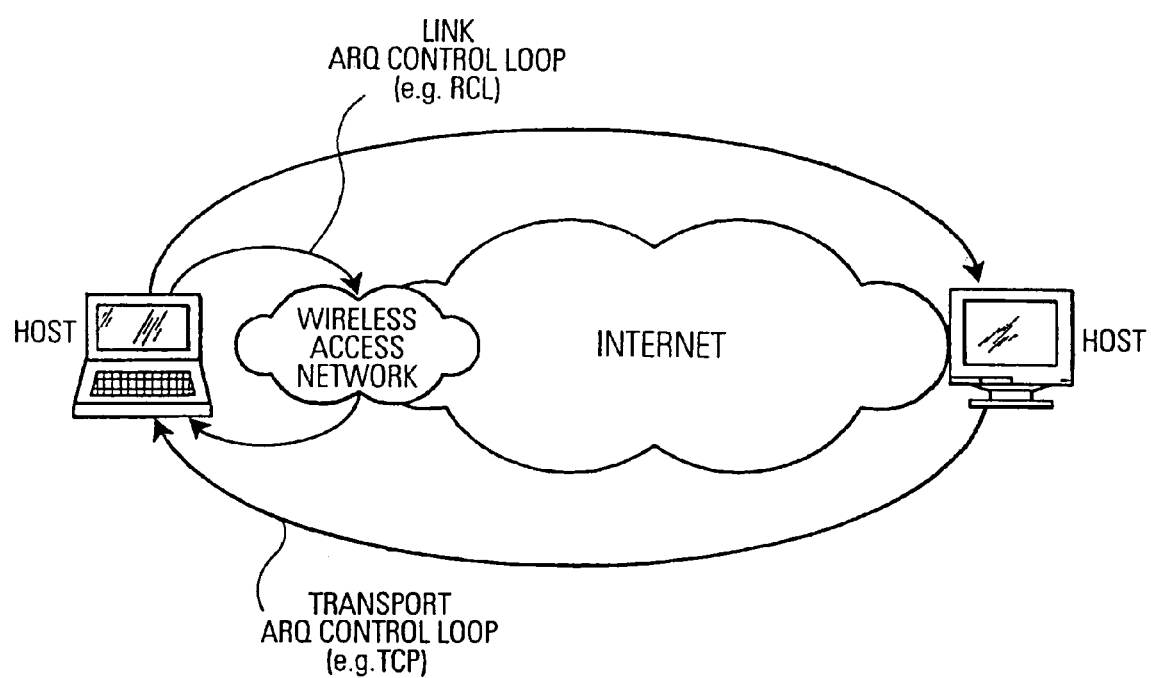
FIG. 4 is an explanatory diagram for illustrating a situation in which an excessive delay may be caused in a connection between two host computers.

FIG. 4 shows a situation, where two host computers act as peers of the TCP (indicated by the long arrows from host to host at the bottom and top of the figure). The lower protocol layers comprise a radio link over a wireless access network to the internet. The connection between the internet and the host on the right is not shown. An example of a protocol for the radio link is the so-called radio link control protocol RLC. As indicated in FIG. 4, both the transport layer protocol (e.g. TCP) and the link layer protocol (e.g. RLC) have an ARQ (Automatic Retransmission reQuest) function. This means that these protocols both implement time-out and retransmission functions. In the situation of FIG. 4, due to the ARQ being used at the link layer, a race condition is generated between the link layer and the transport layer: while the link layer retransmits data, the transport retransmission timer might expire, leading to a spurious time-out. The retransmissions at the link layer can be due e.g. to transmission errors or to data loss because of handovers.

It may also be noted that the transmission delay over the wireless network is often a considerable fraction of the end-to-end delay between the sending and receiving peer of the transport layer protocol. If in this case the bandwidth available to the transport layer connection in the wireless network drops considerably over a short period of time, the resulting increase in the end-to-end delay between the transport layer sender and receiver might lead to spurious time-outs. Examples of bandwidth drops include mobile hosts executing a handover into a cell which provides less bandwidth than the old cell.

As already indicated previously; when employing the present invention, the problem described in connection with FIG. 3 can be avoided. More specifically, when applying the method described in connection with FIG. 1 to the problem in FIG. 3, then the sending peer is capable of distinguishing between acknowledgment data units to the original transmission of a data unit and acknowledgment data units to the retransmission of a data unit. From this information, the sender can decide if a spurious time-out has occurred, or if there indeed has been a loss of a data unit. The sender can then react accordingly.

More specifically, in the example of FIG. 3, the sender using the invention will be able to identify the acknowledgment data unit received after having retransmitted the shown first packet as being an acknowledgment for the original transmission (t=10s) and not for the retransmission (t=15s). Due to this, the sender will perform an appropriate response procedure to the excessive delay, namely not retransmit the data units following the first retransmitted data unit, and also not decrease the transmission rate, much rather the sender will increase the time-out period employed in the flow control on the basis of the measured delay between the original sending of the data unit and the receipt of the corresponding acknowledgment data unit for said original sending. In this way, further spurious retransmissions and time-outs can be avoided.

As may be seen, the present invention is capable of providing a mechanism that allows a more flexible communication system when using a protocol that provides acknowledgment of data and a time-out function or duplicate acknowledgment detection function. In the example just described, the invention is capable of qualifying a triggering event, i.e. distinguishing between at least two different causes, and then capable of invoking an appropriate response procedure. It may be noted that in the above examples the modes for adapting the adaptive parameters were associated with data unit loss on the one hand and excessive delay on the other, but naturally the present invention is by no means restricted thereto. Much rather, the modes for adapting the adaptive parameters may be associated with any possible cause of time-out events or duplicate acknowledgment events.

In the embodiment described in FIG. 1, it was decided in step S5 if the acknowledgment data unit associated with a given data unit. acknowledged the original transmission or the retransmission of said given data unit. According to a first preferred embodiment for implementing this step, the sender keeps a record of the round trip time RTT associated with the connection between sending and receiving peer, and especially keeps a record of the shortest RTT found during the connection or session up to the point of time under consideration. Then, if an acknowledgment data unit for a retransmitted data unit is received within a time period that is smaller than a predetermined fraction of said shortest RTT, then the sender determines that this acknowledgment belongs to the original transmission and not the retransmission. This fraction may be set to a fixed value, or may itself be an adaptive parameter. Naturally, it is not necessary that the comparison value multiplied with said fraction is the shortest measured RTT, much rather it is also possible that the sender keeps an average RTT value. In this sense, the comparison value to be multiplied by said fraction is generally a function of one or more RTT values measured in the course of the connection (during the session).

According to another preferred embodiment for implementing step S5, the sender adds a mark to data units that it sends, where said mark is defined in such a way that it allows to distinguish between an original transmission and a retransmission. Then, the receiver can accordingly mark acknowledgment data units, such that the sender is capable of identifying if an acknowledgment refers to the original transmission or the retransmission.

This marking of data units can be done in any desired way. For example, it would in theory be possible to simply designate a single bit in the data units, where a value of 0 would indicate original transmission and a value of 1 a retransmission, or vice versa. In a general sense, a bit string can be chosen that may also convey some more information. However, in connection with protocols that provide for such an option, it is preferred to use the time stamp option. This option is e.g. well known for TCP, see the above mentioned book by W. R. Stevens. In other words, it is preferred to include a time stamp in sent data units, which indicates when the data unit was sent. The receiver can then simply include the same time stamp in the acknowledgment data unit, so that the sender has a unique way of identifying the data units to which the acknowledgment refers.

Although embodiments of the present invention has been described in connection with preferred embodiments, these do not restrict the scope, and are only intended to convey a better understanding of the invention. Much rather, the scope of the invention is determined by the appended claims.

What is claimed is:

1. In a data unit oriented communication between a sender and a receiver, in which the sender divides an amount of data to be sent into one or more data units, and the receiver acknowledges correct receipt of the data units by returning acknowledgment data units to the sender, a method of detecting whether an acknowledgment data unit received by the sender corresponds to an original transmission of a data unit or a retransmission of a data unit, said method comprising:

for original transmissions of data units, adding a first mark by the sender to each transmitted data unit;

for retransmissions of data units, adding a second, different mark by the sender to each transmitted data unit;

receiving by the receiver, a data unit and a corresponding mark;

adding the corresponding mark by the receiver to an acknowledgment data unit corresponding to the received data unit;

sending the acknowledgment data unit from the receiver to the sender; and determining by the sender whether the data unit received by the receiver was an original transmission of the data unit or a retransmission of the data unit, based on the mark received by the sender in the acknowledgment data unit.

2. The method of claim 1, wherein the first and second marks are different predetermined bit strings.

3. The method of claim 1, wherein the first and second marks are different time stamps.

4. The method of claim 1, wherein the communication is conducted using the Transmission Control Protocol.

5. A communication device for communicating data units between a sender and a receiver, wherein the sender divides an amount of data to be sent into one or more data units, and the receiver acknowledges correct receipt of the data units by returning acknowledgment data units to the sender, said device comprising:

means for adding a first mark by the sender to each data unit when each data unit is originally transmitted by the sender;

means for adding a second, different mark by the sender to any data unit that is retransmitted by the sender;

means for receiving by the sender, an acknowledgment data unit from the receiver, said acknowledgment data unit including a mark corresponding to either the first mark or the second mark; and means for determining by the sender whether the acknowledgment data unit is associated with an originally transmitted data unit or a retransmitted data unit, based on the mark included in the acknowledgment data unit.

6. The device of claim 5, wherein the first and second marks are different predetermined bit strings.

7. The device of claim 5, wherein the first and second marks are different time stamps.

8. The device of claim 5, wherein the sender and receiver communicate using the Transmission Control Protocol.

9. In a data unit oriented communication between a sender and a receiver, in which the sender divides an amount of data to be sent into one or more data units, and the receiver acknowledges correct receipt of the data units by returning acknowledgment data units to the sender, a method of detecting whether an acknowledgment data unit received by the sender corresponds to an original transmission of a data unit or a retransmission of a data unit, said method comprising:

measuring by the sender, a round trip time required for an originally transmitted data unit to be received by the receiver, and for a corresponding acknowledgment data unit sent by the receiver to be received by the sender;

deriving a value from one or more measured round trip times;

measuring a time period between a retransmission of a data unit and the receipt of a first acknowledgment data unit associated with the data unit that was retransmitted;

comparing the measured time period to the value derived from one or more of the measured round trip times; and determining whether the received acknowledgment data unit is associated with an original transmission of the data unit or the retransmission of the data unit based on a result of the comparing step.

10. The method of claim 9, wherein the step of deriving a value from one or more measured round trip times includes measuring a plurality of round trip times and identifying the shortest round trip time as the derived value.

11. The method of claim 10, wherein the step of determining whether the received acknowledgment data unit is associated with an original transmission of the data unit or the retransmission of the data unit includes determining that the received acknowledgment data unit is associated with a retransmission if the time period between the retransmission of the data unit and the receipt of the first acknowledgment data unit associated with the data unit is smaller than a predetermined fraction of the derived value.

12. A communication device in a sender that communicates with a receiver, wherein the sender divides an amount of data to be sent into one or more data units, and the receiver acknowledges correct receipt of the data units by returning acknowledgment data units to the sender, said device comprising:

means for measuring a round trip time required to receive an acknowledgment data unit sent by the receiver in response to an originally transmitted data unit;

means for deriving a value from one or more measured round trip times;

means for measuring a time period between a retransmission of a data unit and the receipt of a first acknowledgment data unit associated with the data unit that was retransmitted;

means for comparing the measured time period to the value derived from one or more of the measured round trip times; and means for determining whether the received acknowledgment data unit is associated with an original transmission of the data unit or the retransmission of the data unit based on a result output by the comparing means.

13. The device of claim 12, wherein the means for deriving a value from one or more measured round trip times measures a plurality of round trip times and identifies the shortest round trip time as the derived value.

14. The device of claim 13, wherein the means for determining whether the received acknowledgment data unit is associated with an original transmission of the data unit or the retransmission of the data unit determines that the received acknowledgment data unit is associated with a retransmission if the time between the retransmission of the data unit and the receipt of the first acknowledgment data unit associated with the data unit is smaller than a predetermined fraction of the derived value.

* * * * *

UNITED STATES PATENT AND TRADEMARK OFFICE
CERTIFICATE OF CORRECTION

PATENT NO. : 7,158,544 B2  
APPLICATION NO. : 11/036881  
DATED : January 2, 2007  
INVENTOR(S) : Meyer et al.

It is certified that error appears in the above-identified patent and that said Letters Patent is hereby corrected as shown below:

In Column 1, Line 61, delete "." before "which".

In Column 7, Line 40, delete "previously:" and insert -- previously, --, therefor.

In Column 8, Line 17, after "data unit" delete ".".

Signed and Sealed this

Third Day of June, 2008

JON W. DUDAS  
*Director of the United States Patent and Trademark Office*